(12) United States Patent
Finke et al.

(10) Patent No.: US 11,152,837 B2
(45) Date of Patent: Oct. 19, 2021

(54) GENERATOR ARRANGEMENTS AND METHODS OF GENERATING ELECTRIC POWER WITH GENERATOR ARRANGEMENTS

(71) Applicant: Hamilton Sundstrand Corporation, Charlotte, NC (US)

(72) Inventors: Aaron M. Finke, Janesville, WI (US); Andreas C. Koenig, Rockford, IL (US); Glenn C. Lemmers, Jr., Loves Park, IL (US); Jonathan C. Dell, Elgin, IL (US); Andrew P. Grosskopf, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 136 days.

(21) Appl. No.: 16/563,223

(22) Filed: Sep. 6, 2019

(65) Prior Publication Data
US 2021/0075292 A1   Mar. 11, 2021

(51) Int. Cl.
*H02K 7/00*   (2006.01)
*F16C 3/02*   (2006.01)
*F16D 11/16*   (2006.01)
*F16D 23/12*   (2006.01)

(52) U.S. Cl.
CPC ............ *H02K 7/003* (2013.01); *F16C 3/02* (2013.01); *F16D 11/16* (2013.01); *H02K 7/006* (2013.01); *F05D 2260/4031* (2013.01); *F16C 2380/26* (2013.01); *F16D 2023/123* (2013.01)

(58) Field of Classification Search
CPC .......... H02K 7/075; H02K 7/08; H02K 7/116; H02K 2201/03; F16H 37/122; F16H 2057/02073

USPC .......................................................... 310/20
See application file for complete search history.

(56) References Cited

U.S. PATENT DOCUMENTS

| | | |
|---|---|---|
| 4,139,780 A | 2/1979 | Hucker et al. |
| 4,868,406 A | 9/1989 | Glennon et al. |
| 2006/0105642 A1 | 5/2006 | Ries et al. |
| 2011/0211979 A1 | 9/2011 | Schlenhoff et al. |
| 2011/0273043 A1 | 11/2011 | Raad |
| 2014/0191599 A1 | 7/2014 | Joung et al. |
| 2016/0146264 A1 | 5/2016 | Lemmers, Jr. |
| 2017/0016489 A1 | 1/2017 | Grosskopf et al. |
| 2019/0203647 A1 | 7/2019 | Hochstetler et al. |

FOREIGN PATENT DOCUMENTS

DE    102007025954 A1    12/2008

OTHER PUBLICATIONS

European Search Report for Application No. 19215240.3, dated Jun. 30, 2020, 74 pages.

*Primary Examiner* — Terrance L Kenerly
(74) *Attorney, Agent, or Firm* — Cantor Colburn LLP

(57) ABSTRACT

A generator arrangement includes a housing with a mounting feature, a main generator with an outboard shaft arranged within the housing and axially offset from the mounting feature along a rotation axis, and a permanent magnet generator. The permanent magnet generator has an inboard shaft arranged within the housing between the main generator and the mounting feature. The outboard shaft is coupled to the inboard shaft to provide rotation to the main generator through the permanent magnet generator. Accessory gearboxes and methods of generating electrical power are also described.

19 Claims, 7 Drawing Sheets

GENERATOR ARRANGEMENTS AND METHODS OF GENERATING ELECTRIC POWER WITH GENERATOR ARRANGEMENTS

BACKGROUND

The present disclosure is generally related to electrical systems, and more particularly, to providing power to electrical systems using generator arrangements having more than one generator.

BRIEF DESCRIPTION

Electrical systems, such as electrical systems on aircraft, commonly include main generators and permanent magnet generators. Main generators typically receive mechanical power from an engine through a main generator input shaft. The mechanical power is converted to electrical power, which is provided to various electrical loads connected to the main generator. Permanent magnet generators also receive mechanical power from the engine, typically through a permanent magnet generator input shaft, and convert the mechanical power into electrical power for electrical loads connected to the permanent magnet generator.

In some vehicles the main generator and the permanent magnet generator are separate units each having a separate mechanical input. The permanent magnet generator mechanical input generally allows the permanent magnet generator to continue to provide electrical power to loads connected to the permanent magnet generator in the event that the main generator develops a fault. Similarly, the main generator mechanical input typically allows the main generator to continue to provide electrical power to loads connected to the main generator in the event that the permanent magnet generator develops a fault.

Such systems and methods have generally been acceptable for their intended purpose. However, there remains a need for improved generator arrangements, accessory gearbox assemblies, and methods of generating electrical power using permanent magnet generators and main generators.

BRIEF SUMMARY

A generator arrangement is provided. The generator arrangement includes a housing with a mounting feature, a main generator with an outboard shaft arranged within the housing and axially offset from the mounting feature along a rotation axis, and a permanent magnet generator. The permanent magnet generator has an inboard shaft arranged within the housing between the main generator and the mounting feature. The outboard shaft is coupled to the inboard shaft to provide rotation to the main generator through the permanent magnet generator.

In addition to one or more of the features described above, or as an alternative, further embodiments of the generator arrangement may include that the housing defines a permanent magnet generator chamber and a main generator chamber and that the permanent magnet generator chamber arranged axially between the mounting feature and the main generator chamber.

In addition to one or more of the features described above, or as an alternative, further embodiments of the generator arrangement may include an inboard seal member fluidly separating the permanent magnet generator chamber and the main generator chamber from the external environment.

In addition to one or more of the features described above, or as an alternative, further embodiments of the generator arrangement may include an outboard seal member fluidly separating the permanent magnet generator chamber from the main generator chamber.

In addition to one or more of the features described above, or as an alternative, further embodiments of the generator arrangement may include that the permanent magnet generator is arranged within the permanent magnet generator chamber and that the main generator is arranged within the main generator chamber.

In addition to one or more of the features described above, or as an alternative, further embodiments of the generator arrangement may include a permanent magnet generator coolant circuit arranged within the housing and in thermal communication with the permanent magnet generator and a main generator coolant circuit arranged within the housing and in thermal communication with the main generator, the main generator coolant circuit fluidly isolated from the permanent magnet generator coolant circuit In addition to one or more of the features described above, or as an alternative, further embodiments of the generator arrangement may include a permanent magnet generator coolant inlet port in fluid communication with the permanent magnet generator coolant circuit, the permanent magnet generator coolant inlet port arranged radially inward of the mounting feature In addition to one or more of the features described above, or as an alternative, further embodiments of the generator arrangement may include a permanent magnet generator coolant outlet port in fluid communication with the permanent magnet generator coolant circuit, the permanent magnet generator coolant outlet port and the mounting feature arranged at a common radial location.

In addition to one or more of the features described above, or as an alternative, further embodiments of the generator arrangement may include a coupling connecting the outboard shaft to the inboard shaft.

In addition to one or more of the features described above, or as an alternative, further embodiments of the generator arrangement may include inboard clutch teeth fixed in rotation relative to the inboard shaft, outboard clutch teeth fixed in rotation relative to the outboard shaft, and a biasing member urging the outboard clutch teeth into mechanical engagement with the inboard clutch teeth.

In addition to one or more of the features described above, or as an alternative, further embodiments of the generator arrangement may include a shear section fixed in rotation relative to the inboard shaft between the coupling and inboard bearings, the inboard bearings supporting the inboard shaft for rotation relative to the housing.

In addition to one or more of the features described above, or as an alternative, further embodiments of the generator arrangement may include a disconnect ramp fixed in rotation relative to the outboard shaft between the coupling and outboard bearing supporting the outboard shaft for rotation relative to the housing.

In addition to one or more of the features described above, or as an alternative, further embodiments of the generator arrangement may include a disconnect member movable relative to the housing between a disengaged position and an engaged position, the outboard shaft fixed in rotation relative the inboard shaft in the disengaged position, and the outboard shaft is rotatable relative to the inboard shaft in the engaged position.

In addition to one or more of the features described above, or as an alternative, further embodiments of the generator arrangement may include a disconnect ramp fixed in rotation relative to the outboard shaft, the disconnect member spaced apart from the ramp structure in the disengaged position, the disconnect member abutting the ramp structure in the engaged position.

In addition to one or more of the features described above, or as an alternative, further embodiments of the generator arrangement may include a disconnect solenoid arranged within the housing and operably connected to the disconnect member.

An accessory gearbox assembly is also provided. The accessory gearbox assembly includes an accessory gearbox and a generator arrangement as described above. The accessory gearbox includes a mount and an input member. The housing of the generator arrangement defines a permanent magnet generator chamber and a main generator chamber, the permanent magnet generator chamber is arranged axially between the mounting feature of the housing and the main generator chamber, and the mounting feature of the housing fixes the generator arrangement to a mount of the accessory gearbox. The input member of the accessory gearbox fixed in rotation relative to the inboard shaft of the permanent magnet generator.

In addition to one or more of the features described above, or as an alternative, further embodiments of the accessory gearbox assembly include a permanent magnet generator coolant circuit arranged within the housing and in thermal communication with the permanent magnet generator, the main generator coolant circuit fluidly isolated from the permanent magnet generator coolant circuit. A coupling of the generator arrangement connects the outboard shaft of the main generator to the inboard shaft of the permanent magnet generator. A disconnect member of the generator arrangement is movable relative to the housing between a disengaged position and an engaged position, the outboard shaft fixed in rotation relative the inboard shaft in the disengaged position and the outboard shaft rotatable relative to the inboard shaft in the engaged position.

A method of generating electrical power is also provided. The method includes, at a generator arrangement as described above, receiving mechanical rotation at the inboard shaft of the permanent magnet generator. The main generator is driven through the permanent magnet generator by rotating the outboard shaft of the main generator with the inboard shaft of the permanent magnet generator.

In addition to one or more of the features described above, or as an alternative, further embodiments of the method may include disconnecting the main generator from the permanent magnet generator with the disconnect member by engaging the disconnect member and continuing to drive the permanent magnet generator after disconnecting the main generator from the permanent magnet generator.

In addition to one or more of the features described above, or as an alternative, further embodiments of the method may include disconnecting the main generator from the permanent magnet generator by fracturing the shear section and continuing to drive the permanent magnet generator after disconnecting the main generator from the permanent magnet generator.

Technical effects of the present disclosure include the capability to drive more than one generator using a single mechanical input. In certain embodiments the present disclosure allows one of the generators to be disconnected without interrupting operation of the other generator(s). It is contemplated that, in accordance with certain embodiments, both a main generator and a permanent magnet generator for an aircraft electrical system can be driven from the single mechanical input as a single line replaceable unit. It is also contemplated that the generator arrangement can be mounted to a single mount of the accessory gearbox, allowing additional accessories to be powered by the accessory gearbox and/or reducing the size of the accessory gearbox.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
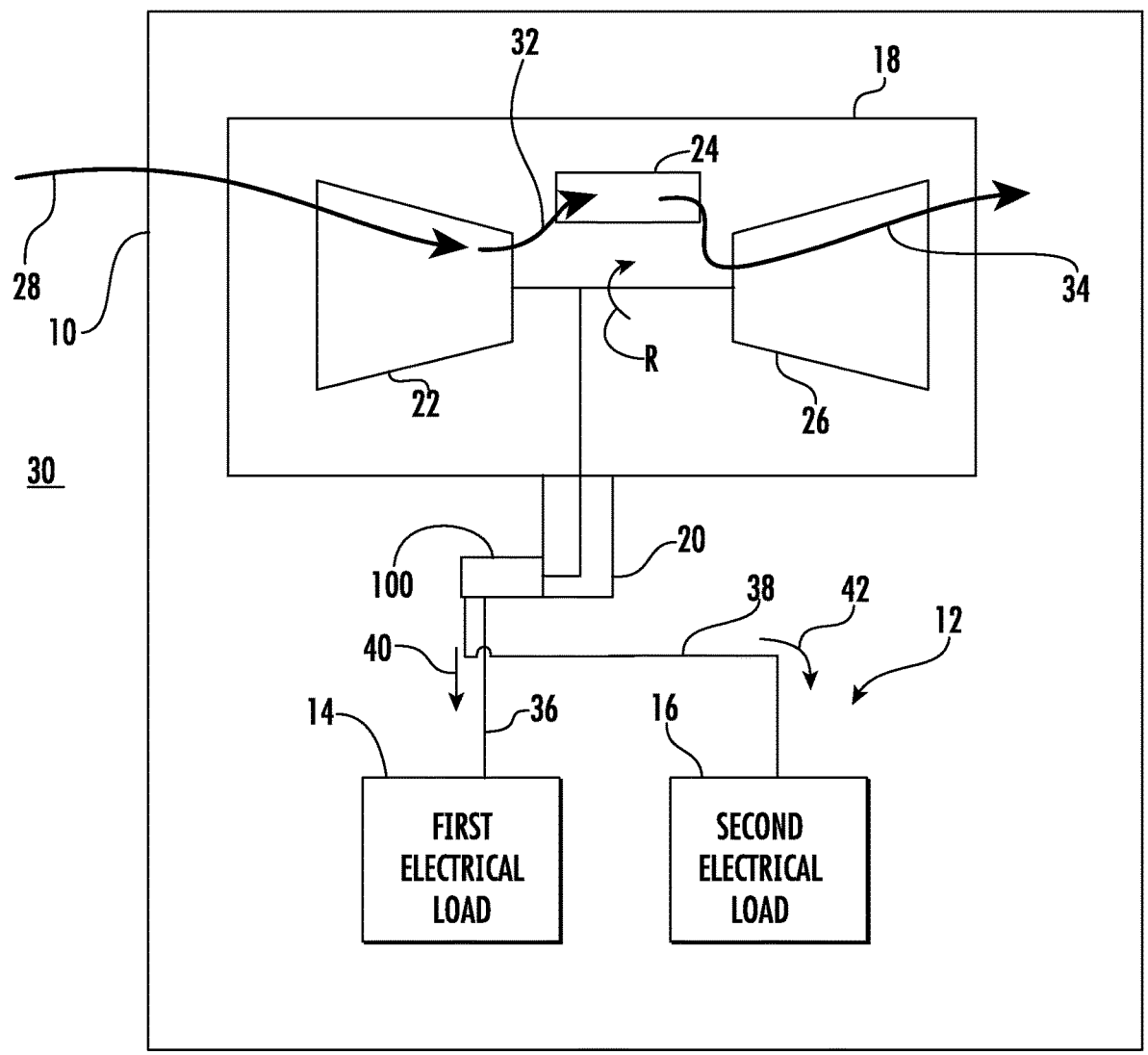
FIG. 1 is a schematic view of an aircraft with an electrical system gas turbine engine, showing an accessory gearbox operably connecting a generator arrangement to the gas turbine engine and providing separate flows of electrical power to electrical loads carried by the aircraft.

Reference will now be made to the drawings wherein like reference numerals identify similar structural features or aspects of the subject disclosure. For purposes of explanation and illustration, and not limitation, a partial view of an exemplary embodiment of a generator arrangement in accordance with the disclosure is shown in FIG. 1 and is designated generally by reference character 100. Other embodiments of generator arrangements, accessory gearbox assemblies, and methods of generating electrical power in accordance with the present disclosure, or aspects thereof, are provided in FIGS. 2-7, as will be described. The systems and methods described herein can be used for generating electrical power using more than one generator driven by a common input member, such as a main generator and a permanent magnet generator supported at a single mount of an accessory gearbox and driven by a gas turbine engine, though the present disclosure is not limited to accessory gearbox-drive generators or to any particular type of electrical generator in general.

With reference to FIG. 1, a vehicle 10, e.g., an aircraft, is shown. The vehicle 10 includes an electrical system 12, a first electrical load 14, and a second electrical load 16. The vehicle 10 also includes a gas turbine engine 18 and an accessory gearbox assembly including the accessory gearbox 20 and the generator arrangement 100. Although shown and described herein in the context of an aircraft electrical system it is to be understood and appreciated that other types of electrical systems can also benefit from the present disclosure.

The gas turbine engine 18 includes a compressor 22, a combustor 24, and a turbine 26. The compressor 22 is configured to ingest air 28 from the external environment 30, compress the ingested air 28 to generate a compressed air flow 32, and provide the compressed air flow 32 to the combustor 24. The combustor 24 is in fluid communication with the compressor 22, receives the compressed air flow 32 from the compressor 22, and generates a flow of high pressure combustion products 34. The flow of high pressure combustion products 34 are communicated to the turbine 26, which expands the high pressure combustion products 34 and extracts work from the expanding high pressure combustion products 34. A portion of the work is communicated to the generator arrangement 100 via the accessory gearbox 20, which generates electric power using the mechanical rotation R.

The electrical system 12 includes a first bus 36 and second bus 38. The first bus 36 electrically connects the first electrical load 14 to the generator arrangement 100 and provides a first flow of electric power 40 to the first electrical load 14. The second bus 38 electrically connects the second electrical load 16 to the generator arrangement 100 and provides a second flow electric power 42 to the second electrical load 16. In certain embodiments the first electrical load 14 can be a safety-critical electrical load carried by the vehicle 10, such as an engine controller or a FADEC device. In accordance with certain embodiments the second electrical load 16 can be a non-safety-critical electrical load carried by the vehicle 10, such as a lighting or convenience circuit. It is contemplated that the first flow of electric power 40 can be a flight-critical device flow of electric power and that the second flow of electric power 42 can be non-flight-critical device flow of electric power.

As will be appreciated by those of skill in the art in view of the present disclosure, in some electrical systems it can be desirable to provide power to safety-critical electrical loads using permanent magnet generators rather than main generators. This is due in part to the relative simplicity and perceived greater reliability of permanent magnet generators in relation to main generators. For this reason some electrical systems include both permanent magnet generators and main generators powered by separate mechanical inputs and each arranged as discrete line-replaceable units (LRUs). While generally acceptable for its intended purpose, mounting the permanent magnet generator and the main generator as discrete LRUs can limit the number of accessories that can be powered through an accessory gearbox. To avoid such limitations the electrical system 12 incudes the generator arrangement 100.

Figure 2:
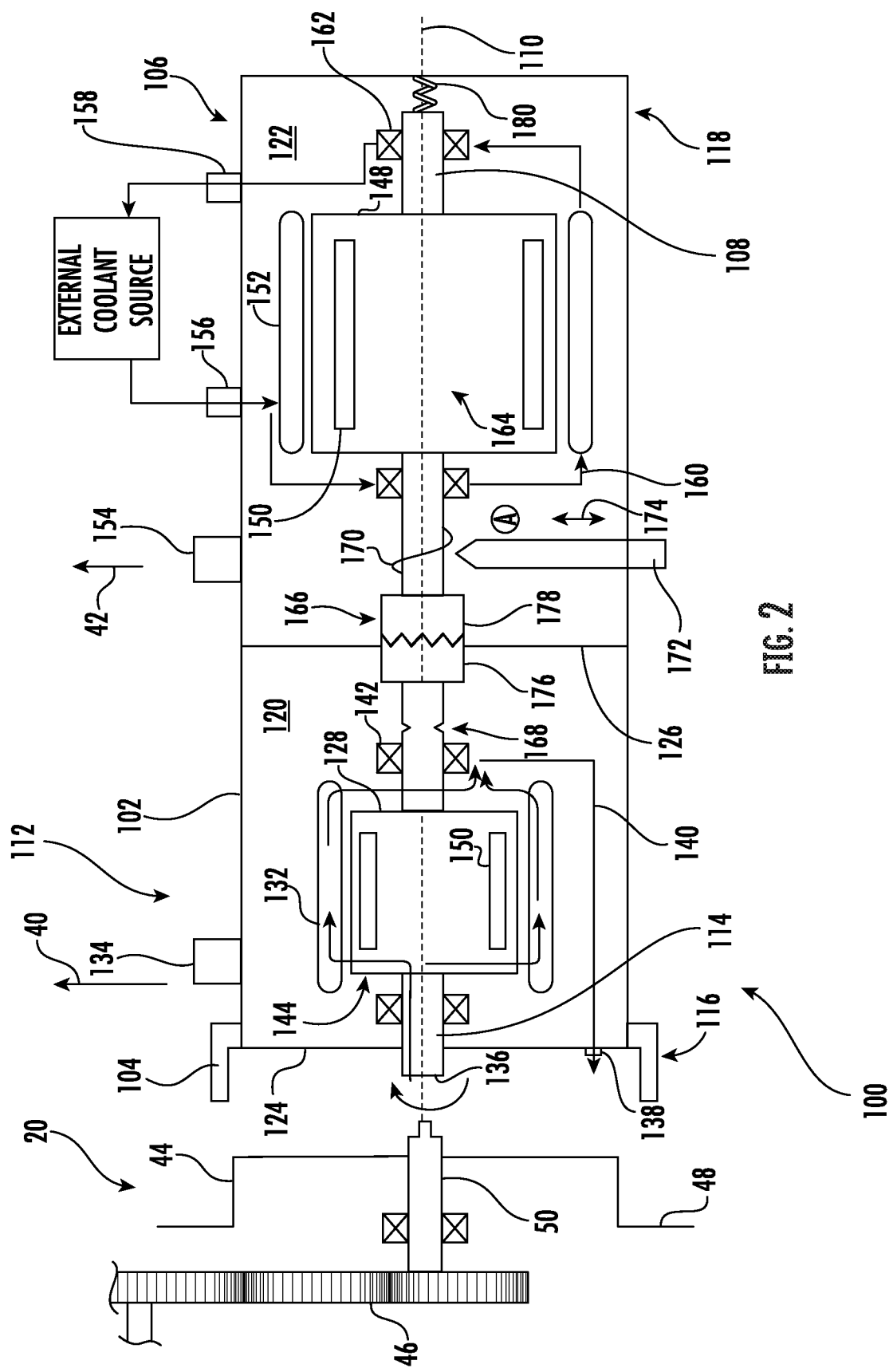
FIG. 2 is a schematic view of the generator arrangement of FIG. 1, showing an inboard shaft and an outboard shaft of the generator arrangement operatively associated with a permanent magnet generator and a main generator, respectively.

With reference to FIG. 2, the generator arrangement 100 is shown. The generator arrangement 100 generally includes a housing 102 with a mounting feature 104, a main generator 106 with an outboard shaft 108 arranged within the housing 102 and axially offset from the mounting feature 104 along the rotation axis 110, and a permanent magnet generator 112. The permanent magnet generator 112 has an inboard shaft 114 arranged within the housing 102 and between the main generator 106 and the mounting feature 104. The outboard shaft 108 is coupled to the inboard shaft 114 to communicate rotation R to the main generator 106 through the permanent magnet generator 112.

The mounting feature 104 is configured and adapted for mounting the generator arrangement at a singular mount of an accessory gearbox. In this respect the generator arrangement 100 is supported at an accessory mount 44 of the accessory gearbox 20. The accessory gearbox 20 in turn includes a gear train 46, a gearbox body 48, and an input member 50. The gearbox body 48 is arranged for coupling the accessory mount 44, and therethrough the generator arrangement 100, to the gas turbine engine 18. The gear train 46 is arranged within the gearbox body 48 and mechanically couples the input member 50 to the turbine 26 (shown in FIG. 1). The input member 50 in turn extends through the accessory mount 44 and is coupled to the PMG 112 and the main generator 106 for communicating mechanical rotation R thereto. In certain embodiment the input member 50 is fixed in rotation relative to the inboard shaft 114. In accordance with certain embodiments the input member 50 is coupled to the inboard shaft by an intermediate gear element, the intermediate gear element allowing the PMG 112 to be arranged off-axis relative to the outboard shaft 108. Off-axis arrangements can provide the generator arrangement 100 with axial compactness and/or allow the generator arrangement 100 to include more than one PMG.

The housing 102 has an inboard end 116, an outboard end 118, a PMG chamber 120, and a main generator chamber 122. The mounting feature 104 is arranged on the inboard end 116 of the housing 102. The PMG chamber 120 and the main generator chamber 122 are defined within the interior of the housing 102, the PMG chamber 120 arranged between the main generator chamber 122 and the mounting feature 104. The PMG 112 is arranged within the PMG chamber 120 and the main generator 106 is arranged within the main generator chamber 122. An inboard seal member 124 is arranged on the inboard end 116 of the housing 102, the inboard seal member 124 fluidly separating both the PMG chamber 120 and the main generator chamber 122 from the accessory gearbox 20. An outboard seal member 126 is arranged within the housing 102 between the PMG chamber 120 and the main generator chamber 122, the outboard seal member 126 fluidly separating the main generator chamber 122 from the PMG chamber 120.

The PMG 112 includes the inboard shaft 114, a PMG core 128, PMG magnets 130, and PMG coils 132. The PMG 112 also includes a PMG electrical connector 134, a PMG coolant inlet port 136, a PMG coolant outlet port 138, and a PMG coolant circuit 140.

The inboard shaft 114 is supported for rotation along the rotation axis 110 within the PMG chamber 120, e.g., via PMG bearings 142. In this respect the permanent magnet generator 112 is supported for rotation independent of main generator 106.

The PMG core 128 and the PMG magnets 130 are fixed in rotation relative to the inboard shaft 114 to form a PMG rotor 144. The PMG coil 132 is fixed relative to the housing 102 and is magnetically coupled to the PMG magnet 130 such that rotation of the PMG rotor 144 induces a flow of electric current in the PMG coil 132. The PMG coil 132 is in turn electrically connected to the first electrical load 14 (shown in FIG. 1) by the PMG electrical connector 134, the PMG 112 thereby providing the induced PMG current to the first electrical load 14 as the first flow of electric power 40 (shown in FIG. 1).

The PMG coolant circuit 140 extends through the PMG chamber 120 and is in fluid communication with the PMG coolant inlet port 136 and the PMG coolant outlet port 138. The PMG coolant inlet port 136 and the PMG coolant outlet port 138 are in turn fixed to the inboard end 116 of the housing 102, e.g., either (or both) located radially inward of mounting feature 104, and are in fluid communication with the accessory gearbox 20. In this respect the accessory gearbox 20 is in fluid communication with the PMG chamber 120 to provide coolant and/or lubricant to the PMG 112 via the PMG coolant circuit 140. This allows the accessory gearbox 20 to manage coolant and/or lubricant flow through the PMG 112. Further, as the outboard seal member 126 fluidly separates the main generator chamber 122 from the PMG chamber 120, the generator arrangement 100 may further have a split coolant and/or lubricant arrangement, coolant and/or lubricant flow in the main generator chamber 122 being managed by the main generator 106. In certain embodiments the PMG coolant inlet port 136 can be arranged radially inward of the mounting feature 104, e.g., within the inboard shaft 114, simplifying installation and/or removal of the generator arrangement 100 from the accessory gearbox 20. In accordance with certain embodiments, the PMG coolant outlet port 138 and the mounting feature 104 can be arranged at a common radial location 146 (shown in FIG. 5), e.g., co-located with one another, also simplifying installation and/or removal of the generator arrangement 100 from the accessory gearbox 20.

The main generator 106 includes the outboard shaft 108, a main generator rotor core 148, and main generator rotor coil 150. The main generator 106 also includes a main generator stator coil 152, a main generator electrical connector 154, and a main generator coolant inlet port 156. The main generator 106 further includes a main generator coolant outlet port 158 and a main generator coolant circuit 160.

The outboard shaft 108 is supported for rotation along the rotation axis 110 within the main generator chamber 122, e.g., via main generator bearings 162. In this respect the main generator 106 is supported for cessation of rotation independent of rotation of the permanent magnet generator 112.

The main generator rotor core 148 and the main generator rotor coil 150 are fixed in rotation relative to the outboard shaft 108 to form a main generator rotor 164. The main generator stator coil 152 is fixed relative to the housing 102 and is magnetically coupled to the main generator rotor coil 150 such that rotation of the main generator rotor 164 induces a flow of electric current in the main generator stator coil 152. The main generator stator coil 152 is in turn electrically connected to the second electrical load 16 (shown in FIG. 1) by the main generator electrical connector 154, the main generator 106 thereby providing the induced main generator current to the second electrical load 16 as the second flow of electric power 42 (shown in FIG. 1).

The main generator coolant circuit 160 extends through the main generator chamber 122 and is in fluid communication with the main generator coolant inlet port 156 and the main generator coolant outlet port 158. The main generator coolant inlet port 156 and the main generator coolant outlet port 158 are in turn fixed to the outboard end 118 of the housing 102 and are in fluid communication with an internal coolant/lubricant pump and an external coolant/lubricant heat exchanger. This allows the main generator 106 to manage coolant and/or lubricant flow through the main generator 106. In certain embodiments, coolant and/or lubricant flow through the main generator may be provided by an external coolant/lubricant pump. Further, as the outboard seal member 126 fluidly separations the main generator chamber 122 from the PMG chamber 120, operation (or cessation of operation) of the main generator 106 and/or the main generator coolant circuit 160 does not impact coolant and/or lubricant flow through the PMG 112.

The generator arrangement 100 also includes a coupling 166, a shear section 168, and a disconnect ramp 170. The generator arrangement further includes a disconnect member 172 and disconnect solenoid 174.

The coupling 166 connects the outboard shaft 108 to the inboard shaft 114, and therethrough to the input member 50. This allows the input member 50 to drive the outboard shaft 108 (and thereby the main generator 106) through the inboard shaft 114 and the permanent magnet generator 112. In the illustrated example the coupling 166 includes inboard clutch teeth 176 and outboard clutch teeth 178. The inboard clutch teeth 176 are fixed in rotation relative to the inboard shaft 114 and the outboard clutch teeth 178 are fixed in rotation relative to the outboard shaft 108. In certain embodiments a biasing member 180 can be arranged between the outboard shaft 108 and the housing 102, the biasing member 180 urging the outboard clutch teeth 178 into engagement with the inboard clutch teeth 176 such that main generator rotor 164 rotates in concert with the PMG rotor 144.

Figure 3:
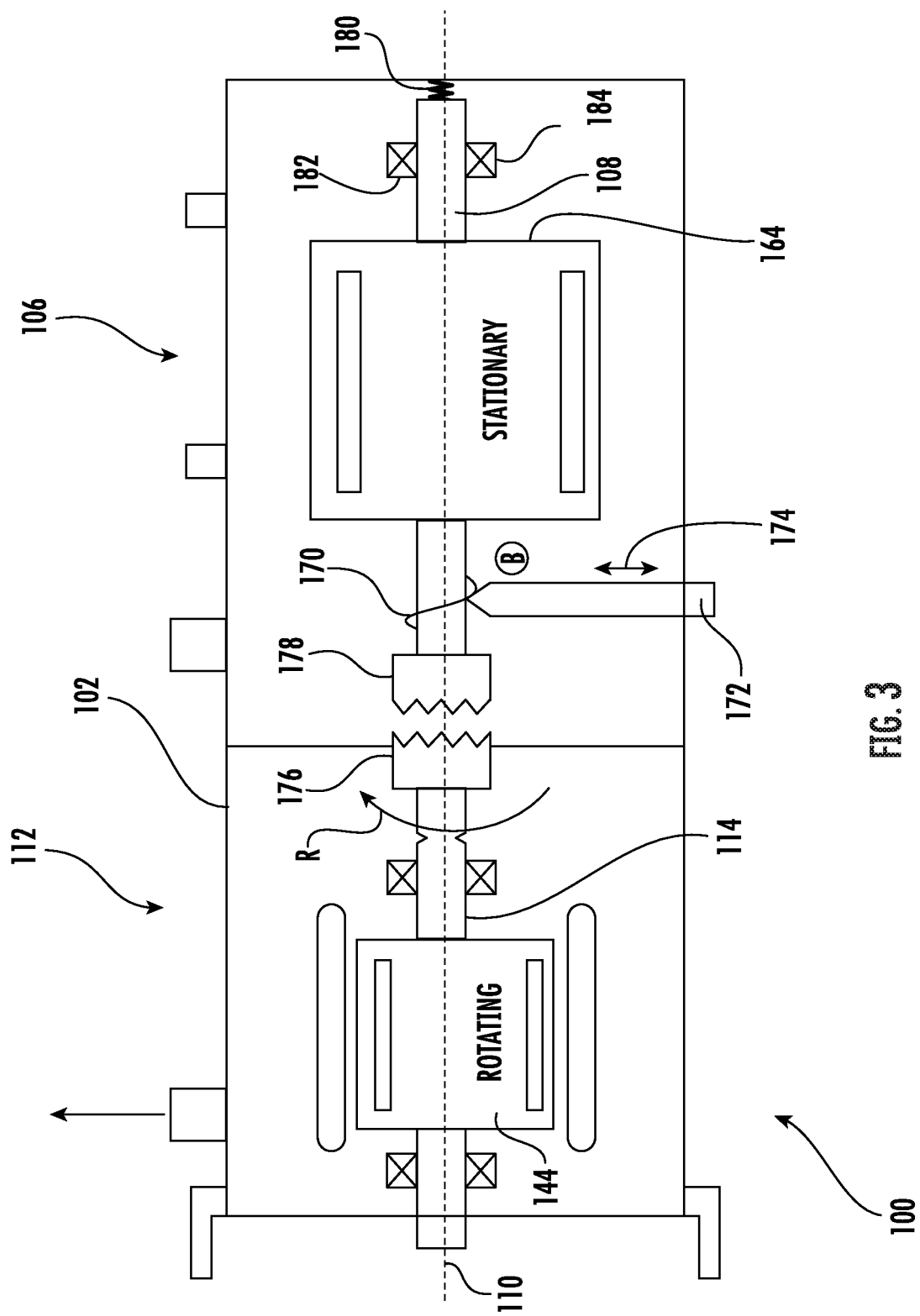
FIG. 3 is a schematic view of the generator arrangement of FIG. 1, showing the outboard shaft disconnected from the inboard shaft by engagement of a disconnect member, the permanent magnet generator continuing to provide electrical power.

With reference to FIGS. 2 and 3, the disconnect ramp 170 is fixed in rotation relative to the outboard shaft 108. In certain embodiments the disconnect ramp 170 is fixed in rotation relative to the outboard shaft 108 between the coupling 166 and the main generator bearings 162 supporting the outboard shaft 108 for rotation relative to the housing 102. This positioning limits the axial length of the generator arrangement 100. As will be appreciated by those of skill in art in view of the present disclosure, the disconnect ramp 170 can be located at other positions relative to the main generator rotor 164 and remain within the scope of the present disclosure.

The disconnect member 172 and the disconnect solenoid 174 are located within the housing 102. This provides compactness to the generator arrangement 100, enabling both the PMG 112 and the main generator 106 to be packaged as a single LRU.

The disconnect member 172 is movable relative to the housing 102 between a disengaged position A (shown in FIG. 2) and an engaged position B (shown in FIG. 3). As shown in FIG. 2, in the disengaged position A the disconnect member 172 is spaced apart from the disconnect ramp 170. Spacing the disconnect member 172 apart from the disconnect ramp 170 allows the biasing member 180 to drive the outboard clutch teeth 178 into engagement with the inboard clutch teeth 176. Engagement of the inboard clutch teeth 176 with the outboard clutch teeth 178 fixes the outboard shaft 108 in rotation relative to the inboard shaft 114. Rotational fixation of the outboard shaft 108 to the inboard shaft 114 in turn causes the main generator rotor 164 to rotate in concert with the PMG rotor 144 about the rotation axis 110. The concerted rotation of the main generator rotor 164 and the PMG rotor 144 cause both the main generator 106 and the PMG 112 to generate electric power, the PMG 112 providing the first flow of electrical power 40 to the first electrical load 14 (shown in FIG. 1) and the main generator 106 providing the second flow of electric power 42 to the second electrical load 16 (shown in FIG. 1).

As shown in FIG. 3, the outboard shaft 108 is rotatable relative to the inboard shaft 114 when the disconnect member 172 is in the disengaged position B. In this respect movement from the disengaged position A (shown in FIG. 2) to the engaged position B brings the disconnect member 172 into mechanical engagement, i.e. contact, with the disconnect ramp 170. Mechanical engagement of the disconnect member 172 with the disconnect ramp 170 in turn exerts a disconnect force 182 on the outboard shaft 108 in a direction axially opposite a biasing force 184 exerted by the biasing member 180 on the outboard shaft 108.

It is contemplated that the disconnect force 182 is a magnitude greater than the biasing force 184, the disconnect member 172 thereby translating the outboard shaft 108 axially along the rotation axis 110 and in a direction opposite the PMG 112. Translation of the outboard shaft 108 away from the PMG 112 in turn causes the outboard clutch teeth 178 to separate from the inboard clutch teeth 176, the main generator rotor 164 thereby ceasing concerted rotation of the main generator rotor 164 with the PMG rotor 144 about the rotation axis 110. In certain embodiments it is contemplated that the PMG rotor 144 continues to rotate about the rotation axis 110 such that the PMG 112 continues to provide the first flow of electric power 40 to the first electric load 14 (shown in FIG. 1), and that the main generator rotor 164 ceases rotation about the rotation axis 110—the main generator 106 thereby ceasing to provide the second flow of electric power 42 to second electrical load 16. This allows for a commanded shutdown of the main generator 106, such as in the event that a main generator fault warrants shutdown of the main generator 106.

Movement of the disconnect member 172 from the disengaged position A to the engaged position B is accomplished by the disconnect solenoid 174. For example, in certain embodiments, the disconnect member 172 may move to the engaged position B when power is applied to the disconnect solenoid 174. As will be appreciated by those of skill in the art in view of the present disclosure, the disconnect solenoid 174 allows for controlled disconnection of the main generator 106 from the PMG 112, and therethrough to the input member 50 (shown in FIG. 2).

Figure 4:
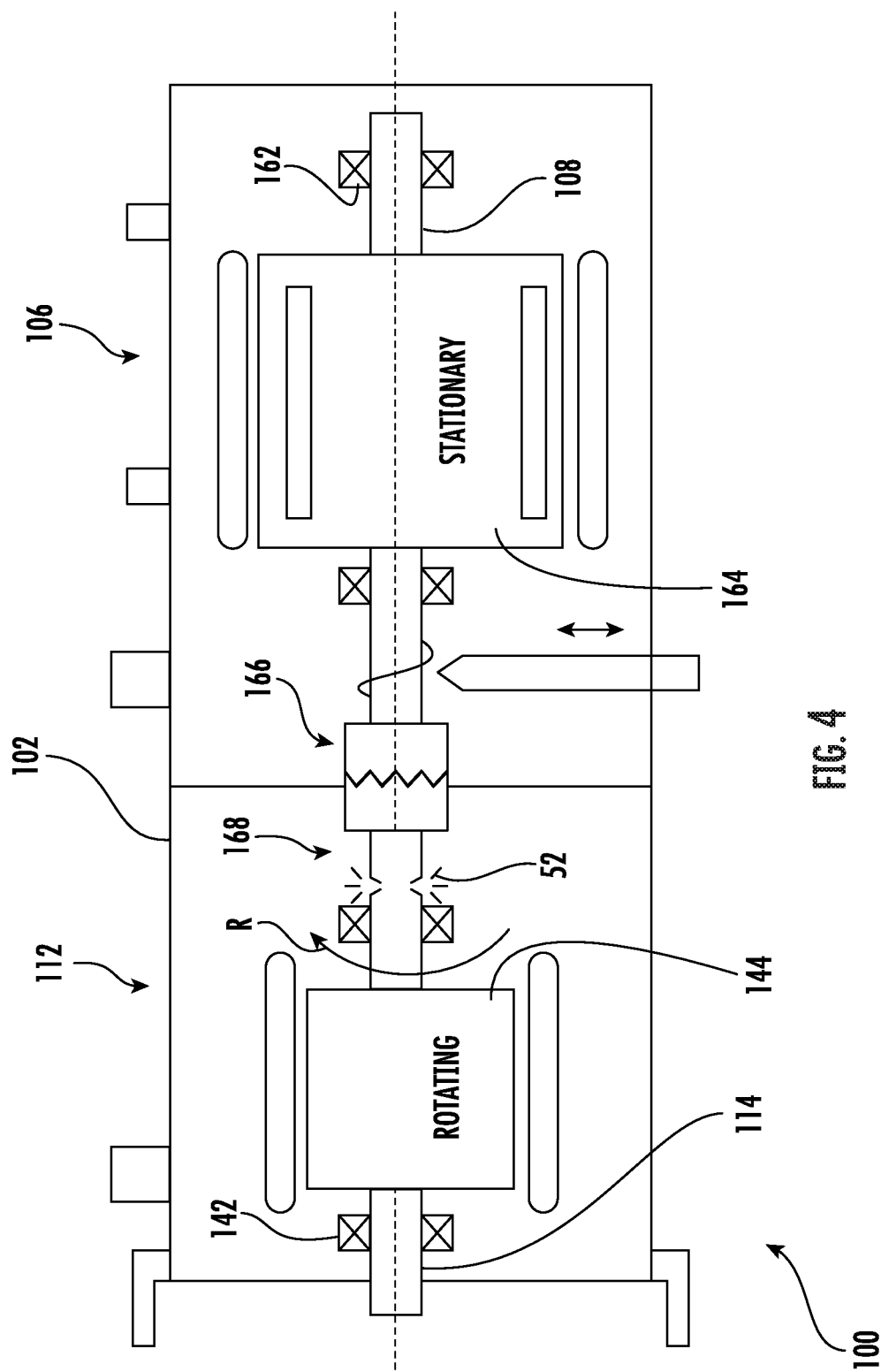
FIG. 4 is a schematic view of the generator arrangement of FIG. 1, showing the outboard shaft disconnected from the inboard shaft by fracture of a shear section, the permanent magnet generator continuing to provide electrical power.

Referring to FIGS. 2 and 4, the shear section 168 is fixed in rotation relative to the inboard shaft 114. In certain embodiments the shear section 168 is fixed in rotation relative to the inboard shaft 114 at a location between the coupling 166 and the PMG bearings 142 supporting the inboard shaft 114 for rotation relative to the housing 102. This positioning limits the likelihood of flail in the event that the shear section fractures during rotation by limiting elements remaining rotationally fixed to the inboard shaft 114 as a consequence of fracture of the shear section 168. As will be appreciated by those of skill in art in view of the present disclosure, the shear section 168 can be located at other positions relative to the PMG rotor 144 and remain within the scope of the present disclosure.

It is contemplated that the shear section 168 be configured to fracture when load exerted on the inboard shaft 114 by the outboard shaft 108 exceeds a predetermined value. As shown in FIG. 4, fracture 52 within the shear section 168 causes the outboard shaft 108 to separate from the inboard shaft 114. Separation of the outboard shaft 108 from the inboard shaft 114 renders the outboard shaft 108 rotatable relative to the inboard shaft 114, the main generator 106 thereby disconnected from the inboard shaft 114 and therethrough the input member 50 (shown in FIG. 2).

In certain embodiments it is contemplated that the PMG rotor 144 continue to rotate about the rotation axis 110 such that the PMG 112 continues to provide the first flow of electric power 40 to the first electric load 14 (shown in FIG. 1), and that the main generator rotor 164 cease rotation about the rotation axis 110—the main generator 106 thereby ceasing to provide the second flow of electric power 42 to second electrical load 16—subsequent to the fracture 52. This allows for uncommanded shutdown of the main generator 106, such as in the event that the main generator 106 binds or becomes overloaded. As will be appreciated by those of skill in the art in view of the present disclosure, disconnection by fracture within the shear section 168 can be more rapid than commanded disconnects, limiting variation in first flow of electric power 40 in the event that the main generator 106 experiences a fault or becomes overloaded.

Figure 5:
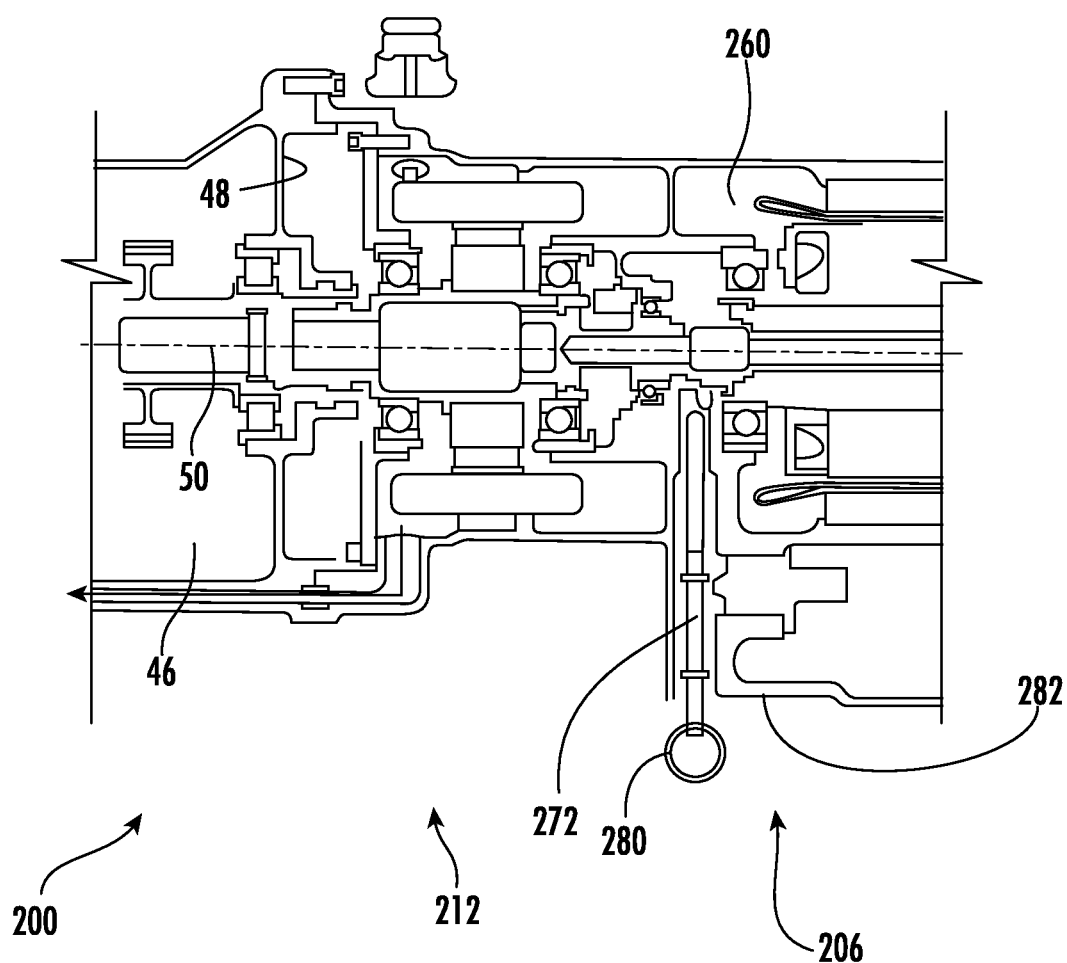
FIG. 5 is a cross-sectional view of a portion of the generator arrangement of FIG. 1 according to an embodiment, showing a disconnect mechanism and a shear section coupling the main generator to the permanent magnet generator through the input shaft and the output shaft.

With reference to FIG. 5, a generator arrangement 200 is shown. The generator arrangement 200 is similar to the generator arrangement 100 (shown in FIG. 1) and additionally includes a main generator 206 having a self-contained main generator coolant circuit 260 and a manual main generator disconnect reset feature 280. The generator coolant circuit 260 is wholly contained within a main generator compartment 222 of the generator arrangement 200. The manual main generator disconnect reset feature 280 is located on an exterior 282 of the main generator 206, is connected to a disconnect member 272, and is arranged to allow the main generator 206 to be reconnected to the PMG 212 following a commanded disconnect when the generator arrangement is at rest. A manual reset can be performed, for example, during servicing and/or maintenance events.

Figure 6:
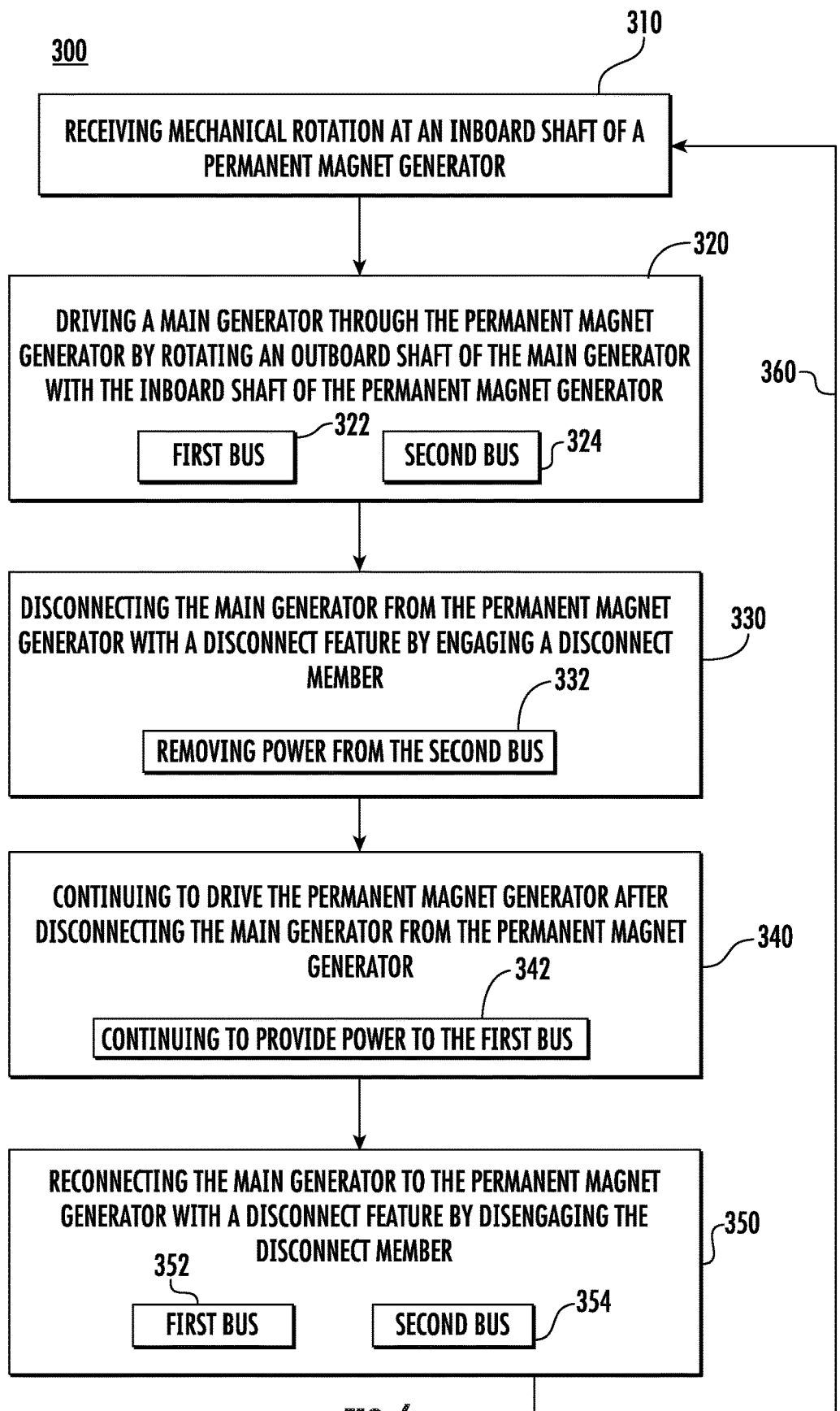
FIGS. 6 and 7 are block diagrams of a method of generating electrical power, showing steps of the method according to an illustrative and non-limiting example of the method.

With reference to FIG. 6, a method 300 of generating power with a generator arrangement, e.g., the generator arrangement 100 (shown in FIG. 1), is shown. The method 300 includes receiving mechanical rotation at an inboard shaft of a PMG of the generator arrangement, e.g., the inboard shaft 114 (shown in FIG. 2), as shown with box 310. A main generator, e.g., the main generator 106 (shown in FIG. 1), is driven through the PMG by rotating an outboard shaft of the generator arrangement with the inboard shaft of the generator arrangement, as shown with box 320. Power is provided to a first bus and a second bus, e.g., the first bus 36 (shown in FIG. 1) and the second bus 38 (shown in FIG. 1), as shown with boxes 322 and 324.

As shown with box 330, the main generator can be disconnected from the PMG. It is contemplated that the disconnection can be effected by engaging a disconnect member, e.g., the disconnect member 172 (shown in FIG. 2), by operation of a disconnect solenoid, e.g., the disconnect solenoid 174 (shown in FIG. 2). Disconnection of the main generator from the PMG by engagement of the disconnect member removes power from the second bus, as shown with box 332. The PMG continues to be driven with the main generator disconnected from the PMG, as shown with box 340, the PMG continuing to provide power to the first bus, as shown with box 342.

As shown with box 350, the main generator can thereafter be reconnected to the PMG when the generator arrangement is at rest. It is contemplated that reconnection of the main generator to the PMG be accomplished by disengaging the disconnect member, e.g., by pulling on the manual disconnect feature 280, such that the biasing member 180 urges the outboard clutch teeth 178 into engagement with the inboard clutch teeth 176, the outboard shaft thereby becoming fixed in rotation relative to the inboard shaft. Reconnection of the main generator to the PMG causes the main generator to again be able to provide electric power to the second bus when the generator arrangement is restarted, as shown with box 354. It is also contemplated that the PMG will continue to be able to provide electrical power to the first bus when the generator arrangement is restarted, as shown with box 352. As shown with arrow 360, disconnection and reconnection of the main generator can recur iteratively.

Figure 7:
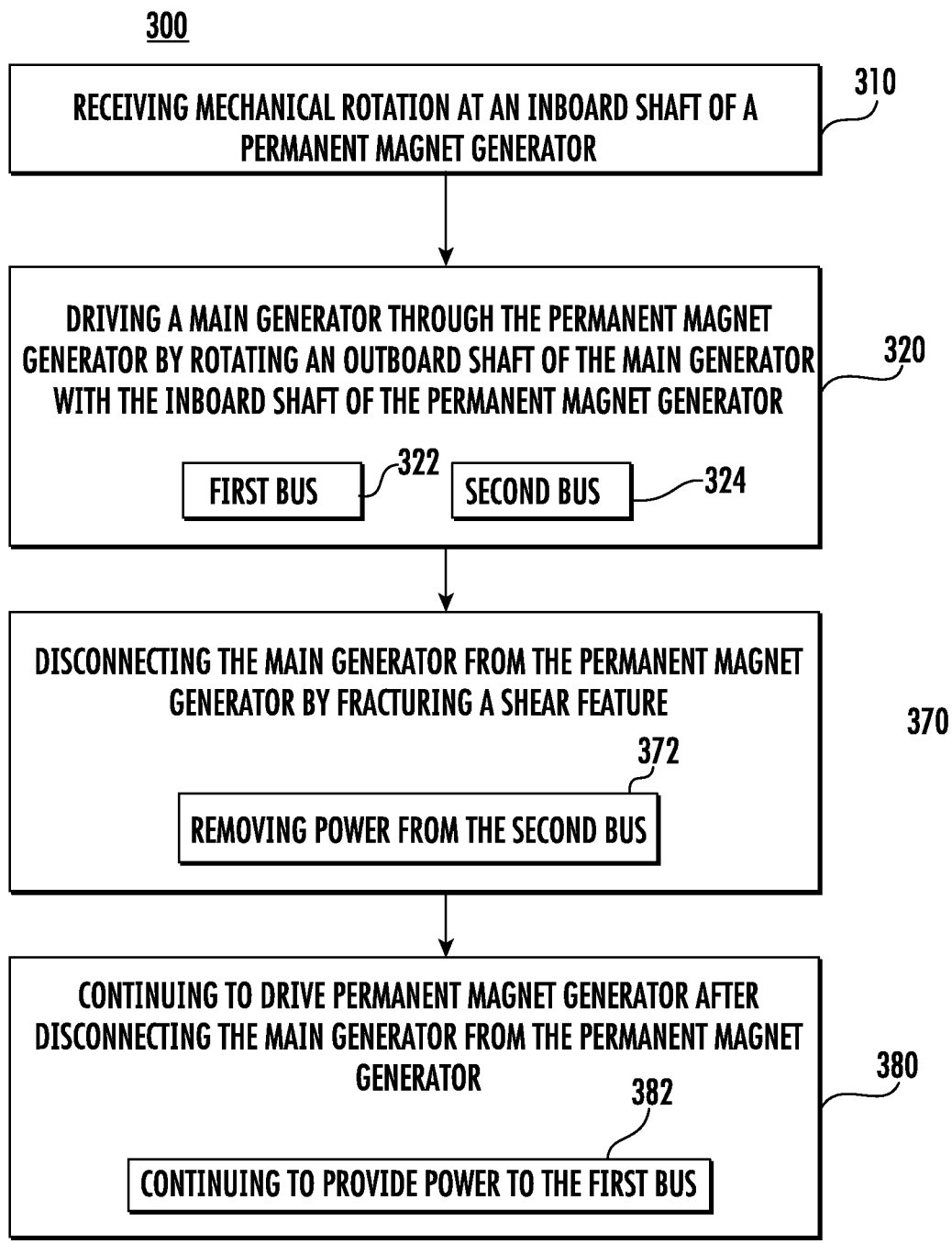

With reference to FIG. 7, it is also contemplated that the main generator can be disconnected by operation of a shear section, e.g., the shear section 168 (shown in FIG. 3). In this respect mechanical rotation can be received at the inboard shaft of the PMG of the generator arrangement. The PMG and the main generator can be driven using the received rotation through the inboard shaft and the outboard shaft, as shown with box 320. It is contemplated that mechanical rotation of the outboard shaft of the generator arrangement provides electrical power to the second bus using the main generator, as shown with box 324. It is also contemplated that mechanical rotation of the inboard shaft of the generator arrangement provide electrical power to the first bus using the PMG, as shown with box 322.

As shown with box 370, the main generator can be disconnected from the PMG by fracture of the shear section, e.g., by torque exerted on the outboard shaft by the main generator above a predetermined value. Fracture of the shear section in turn removes power from the second bus, as shown with box 372. Notwithstanding the fracture of the shear section the PMG continues to be driven by rotation received by the generator arrangement, as shown with box 380, and the PMG continues to provide power to the first bus, as shown with box 382.

Generators are commonly employed to provide electrical power to electrical loads in electrical systems, typically by communicating mechanical rotation to the generator from a rotation source such as a gas turbine engine. In certain electrical systems more than one generator is employed to provide electrical power. For example, a relatively simple PMG can be employed to provide electrical power to flight-critical loads, such as engine controllers, while a comparatively complex main generator provides electrical power to other loads less critical to operation of the aircraft. While generally acceptable for its intended purpose such electrical systems generally require that each generator occupy a separate mount on the accessory gearbox to receive electrical power individually as separate line-replaceable units.

In embodiments described herein generator arrangements include both a PMG and a main generator powered collective with a single a common input member. The PMG is mounted to a single accessory gearbox mount inboard of the main generator such that mechanical rotation received from the accessory gearbox rotates the PMG through an inboard shaft and the main generator through an outboard shaft fixed in rotation relative to the inboard shaft. In certain embodiments a disconnect member is incorporated in the generator arrangement, allowing the main generator to be disconnected without interruption of power provided by the PMG and reconnected to the accessory gearbox through the PMG without interruption of power provided by the PMG when the generator arrangement is at rest. In accordance with certain embodiments the outboard shaft can include a shear section, also allowing the main generator to be disconnected from the accessory gearbox without interrupting power provided by the PMG.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A generator arrangement, comprising:
   a housing with a mounting feature;
   a main generator with an outboard shaft arranged within the housing and axially offset from the mounting feature along a rotation axis;
   a main generator coolant circuit arranged within the housing and in thermal communication with the main generator;
   a permanent magnet generator with an inboard shaft arranged within the housing between the main generator and the mounting feature, wherein the outboard shaft is coupled to the inboard shaft to provide rotation to the main generator through the permanent magnet generator; and
   a permanent magnet generator coolant circuit arranged within the housing and in thermal communication with the permanent magnet generator, wherein the main generator coolant circuit is fluidly isolated from the permanent magnet generator coolant circuit.

2. The generator arrangement as recited in claim 1, wherein the housing defines a permanent magnet generator chamber and a main generator chamber, the permanent magnet generator chamber arranged axially between the mounting feature and the main generator chamber.

3. The generator arrangement as recited in claim 2, further comprising an inboard seal member fluidly separating the permanent magnet generator chamber and the main generator chamber from the external environment.

4. The generator arrangement as recited in claim 2, further comprising an outboard seal member fluidly separating the permanent magnet generator chamber from the main generator chamber.

5. The generator arrangement as recited in claim 2, wherein the permanent magnet generator is arranged within the permanent magnet generator chamber, wherein the main generator is arranged within the main generator chamber.

6. The generator arrangement as recited in claim 1, further comprising a permanent magnet generator coolant inlet port in fluid communication with the permanent magnet generator coolant circuit, the permanent magnet generator coolant inlet port arranged radially inward of the mounting feature.

7. The generator arrangement as recited in claim 1, further comprising a permanent magnet generator coolant outlet port in fluid communication with the permanent magnet generator coolant circuit, the permanent magnet generator coolant outlet port and the mounting feature arranged at a common radial location.

8. The generator arrangement as recited in claim 1, further comprising a coupling connecting the outboard shaft to the inboard shaft.

9. The generator arrangement as recited in claim 8, wherein the coupling comprises:

inboard clutch teeth fixed in rotation relative to the inboard shaft;
outboard clutch teeth fixed in rotation relative to the outboard shaft; and
a biasing member urging the outboard clutch teeth into mechanical engagement with the inboard clutch teeth.

10. The generator arrangement as recited in claim 8, further comprising a shear section fixed in rotation relative to the inboard shaft between the coupling and inboard bearings, the inboard bearings supporting the inboard shaft for rotation relative to the housing.

11. The generator arrangement as recited in claim 8, further comprising a disconnect ramp fixed in rotation relative to the outboard shaft between the coupling and outboard bearing supporting the outboard shaft for rotation relative to the housing.

12. The generator arrangement as recited in claim 1, further comprising a disconnect member movable relative to the housing between a disengaged position and an engaged position, wherein the outboard shaft is fixed in rotation relative the inboard shaft in the disengaged position, wherein the outboard shaft is rotatable relative to the inboard shaft in the engaged position.

13. The generator arrangement as recited in claim 12, further comprising a disconnect ramp fixed in rotation relative to the outboard shaft, the disconnect member spaced apart from the ramp structure in the disengaged position, the disconnect member abutting the ramp structure in the engaged position.

14. The generator arrangement as recited in claim 12, further comprising a disconnect solenoid arranged within the housing and operably connected to the disconnect member.

15. An accessory gearbox assembly, comprising:
a generator arrangement as recited in claim 1, wherein the housing defines a permanent magnet generator chamber and a main generator chamber, the permanent magnet generator chamber arranged axially between the mounting feature and the main generator chamber; and
an accessory gearbox with a mount and an input member, the mounting feature fixing the generator arrangement to the mount, and the input member fixed in rotation relative to the inboard shaft.

16. The accessory gearbox assembly as recited in claim 15, further comprising:
a permanent magnet generator coolant circuit arranged within the housing and in thermal communication with the permanent magnet generator;
a main generator coolant circuit arranged within the housing and in thermal communication with the main generator, wherein the main generator coolant circuit is fluidly isolated from the permanent magnet generator coolant circuit;
a coupling connecting the outboard shaft to the inboard shaft; and
a disconnect member movable relative to the housing between a disengaged position and an engaged position, wherein the outboard shaft is fixed in rotation relative the inboard shaft in the disengaged position, wherein the outboard shaft rotatable relative to the inboard shaft in the engaged position.

17. A method of generating power, comprising:
at a generator arrangement including a housing with a mounting feature, a main generator with an outboard shaft arranged within the housing and axially offset from the mounting feature along a rotation axis, and a permanent magnet generator with an inboard shaft arranged within the housing between the main generator and the mounting feature, the outboard shaft coupled to the inboard shaft;
receiving mechanical rotation at the inboard shaft of the permanent magnet generator;
driving the main generator through the permanent magnet generator by rotating the outboard shaft of the main generator with the inboard shaft of the permanent magnet generator;
providing a coolant and/or lubricant to the permanent magnet generator via a permanent magnet generator coolant circuit arranged within the housing; and
providing a coolant and/or lubricant to the main generator via a main generator coolant circuit arranged within the housing, the main generator coolant circuit being fluidly isolated from the permanent magnet generator coolant circuit.

18. The method as recited in claim 17, wherein the generator arrangement further comprises a disconnect member movable relative to the housing between a disengaged position and an engaged position, the method further comprising:
disconnecting the main generator from the permanent magnet generator with the disconnect member by engaging the disconnect member; and
continuing to drive the permanent magnet generator after disconnecting the main generator from the permanent magnet generator.

19. The method as recited in claim 17, wherein the generator arrangement further comprises a shear section fixed in rotation relative to the inboard shaft, the method further comprising:
disconnecting the main generator from the permanent magnet generator by fracturing the shear section; and
continuing to drive the permanent magnet generator after disconnecting the main generator from the permanent magnet generator.

\* \* \* \* \*